United States Patent [19]

Noda et al.

[11] 4,144,627
[45] Mar. 20, 1979

[54] INTEGRATED CATALYST COMPONENT FOR EXHAUST GAS PURIFICATION AND METHOD OF ASSEMBLING IT

[75] Inventors: Fumiyoshi Noda; Masahiko Sugiyama, both of Toyota, Japan

[73] Assignee: Toyota Jidosha Kogyo Kabushiki Kaisha, Toyota, Japan

[21] Appl. No.: 658,394

[22] Filed: Feb. 17, 1976

[30] Foreign Application Priority Data

Apr. 10, 1975 [JP] Japan .................................. 50-43772

[51] Int. Cl.² .......................... B23P 15/00; F01N 3/15
[52] U.S. Cl. ................................... 29/157 R; 29/446;
29/455 R; 29/463; 422/177; 138/149
[58] Field of Search ................ 29/157 R, 446, 455 R,
29/463; 23/288 FC; 60/299, 301; 138/112, 114,
149; 425/DIG. 119, 388; 264/111

[56] References Cited

U.S. PATENT DOCUMENTS

| 2,031,863 | 2/1936 | Snell | 29/463 |
| 2,324,181 | 7/1943 | Tulien | 138/149 |
| 2,648,125 | 8/1953 | McKenna et al. | 264/111 |
| 2,857,931 | 10/1958 | Lawton | 29/455 |
| 2,980,568 | 4/1961 | Kazmierowicz | 29/455 |
| 3,058,861 | 10/1962 | Rutter | 29/455 |
| 3,153,546 | 10/1964 | Dunn | 138/149 |
| 3,158,474 | 11/1964 | Andersen et al. | 264/111 |
| 3,631,583 | 1/1972 | Haller | 264/111 |
| 3,841,842 | 10/1974 | Wiley | 23/288 FC |
| 3,852,042 | 12/1974 | Wagner | 23/288 FC |
| 3,854,888 | 12/1974 | Frietzsche et al. | 29/455 |
| 3,861,881 | 1/1975 | Nowak | 23/288 FC |
| 3,958,312 | 5/1976 | Weaving et al. | 29/157 R |

FOREIGN PATENT DOCUMENTS 1330293 5/1963 France .................................... 138/149

Primary Examiner—C.W. Lanham
Assistant Examiner—Daniel C. Crane
Attorney, Agent, or Firm—Brisebois & Kruger

[57] ABSTRACT

The present invention relates to an integrated catalyst component comprising an integrated catalyst housed within a molded ceramic fiber retaining sleeve held together by a cylindrical compression ring and end rings attached to the ends of said compression ring, and to a method of assembling said component.

6 Claims, 11 Drawing Figures

INTEGRATED CATALYST COMPONENT FOR EXHAUST GAS PURIFICATION AND METHOD OF ASSEMBLING IT

BACKGROUND OF THE INVENTION

Automotive exhaust gas purifying devices utilizing a catalyst of heavy metal or precious metal are known as one of the conventional means for eliminating harmful elements, such as carbon monoxide, hydrocarbons and nitrogen oxides from automotive exhaust gas. These devices are broadly classified into two types—the so-called pellet catalyst purifier, in which the catalyst metal is carried on a particulate carrier (commonly ceramic); and the so-called integrated catalyst purifier, in which an integrated catalyst, i.e., a catalyst metal carried on a ceramic carrier of cylindrical form with numerous gas passages therein is held by a retaining sleeve within a metal casing, as described in U.S. Pat. Nos. 3,441,381 and 3,441,382.

If the retaining sleeve is effective, the integrated catalyst purifier will be superior to the pellet catalyst type, because there is little possibility that the catalyst metal will be abraded and dissipated as in the case of the pellet catalyst and the casing to be used is comparatively simple and small.

However, if the catalyst is not properly retained by the sleeve, a catalyst of the integrated type will be easily broken by vibration during operation of the vehicle. In particular, the metal of which the casing is fabricated expands more when subjected to the high temperature of the exhaust gas than does the integrated catalyst, and in consequence the retaining sleeve interposed between the casing and the catalyst holds the catalyst less firmly, thereby rendering the catalyst easy to break. For this reason, it is necessary that the retaining sleeve maintain an appropriate grip on the integrated catalyst even when the exhaust gas temperature changes from low to high.

Said retaining sleeve is also required to possess the following characteristics. First, the gripping ability of the retaining sleeve must be durable in that said ability must be retained even when subjected to vibration at high temperature. Next, the retaining sleeve must be dense enough to block the passage of exhaust gas, so that its gripping ability may not diminish due to the passage of exhaust gas through the layer. Numerous studies have been made on the retaining sleeve, resulting in proposals of various structures for it. Actually, however, most of the proposals have been found incapable of providing any retaining sleeve perfectly meeting the above requirements. For instance, the use of metallic fabric has been proposed, but in that case the durability of the gripping ability at high temperature is doubtful. When the temperature of the retaining sleeve amounts to several hundred degrees, the device becomes unsuitable for use as an automotive gas purifier. Under these circumstances a retaining sleeve has been suggested which utilizes the elasticity of ceramic fiber, but as yet nothing which fully meets the requirements of the retaining sleeve is available. One of the reasons that a ceramic fiber retaining sleeve has failed to meet the requirements lies in the fact that ceramic fiber is hard to work and no sleeve with uniformly high density has been obtained. Usually ceramic fiber looks like cotton. As a cushioning mat, it is liable to break and delicate to handle; and accordingly to mold it into a uniformly high density layer is very difficult. Moreover, if it is exposed directly to the exhaust gas, ceramic fiber disintegrates so that it must be sealed against exhaust gas.

BRIEF SUMMARY OF THE INVENTION

The object of the present invention is to provide an integrated catalyst component in which the catalyst is adequately retained, even at high temperature, with no disintegration of the molded ceramic fiber.

Another object of the present invention is to provide an integrated catalyst component which can be readily replaced when the catalyst has deteriorated; which is compact, and can be mass-produced.

Still another object of the present invention is to provide a process of easily assembling said integrated catalyst into a purifying device by externally applying a tightening jig without the use of bolts, and fitting end rings thereto.

DETAILED DESCRIPTION OF THE INVENTION

Before describing the present invention, a conventional catalyst component will first be described.

Figure 1:
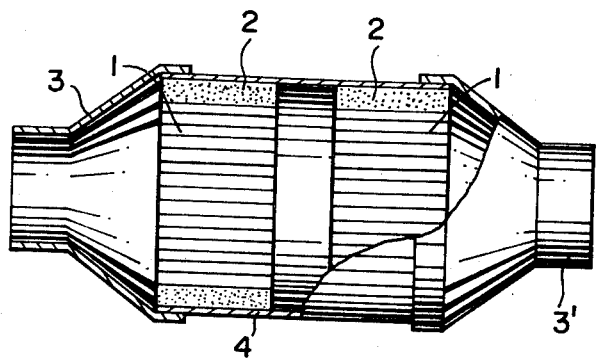
FIG. 1 is a partially cutaway side view of a conventional integrated catalyst purifier.

In FIG. 1 showing an axial section through a conventional integrated catalyst purifier in which the exhaust gas comes into direct contact with the molded ceramic fiber, a molded ceramic fiber sleeve 2 outside the integrated catalyst 1 is housed in an outer casing 4, which is retained between the end members 3. The molded ceramic fiber 2, being exposed directly to hot exhaust gas, will disintegrate easily.

The integrated catalyst component according to the present invention is produced by locating the integrated catalyst in a molded ceramic fiber sleeve within a compression ring and attaching end rings to the ends of the compression ring. The process of assembling the integrated catalyst component according to the present invention is characterized in that the integrated catalyst is axially wrapped in a divided molded ceramic fiber sleeve, and then externally compressed by a divided compression ring. End rings are then attached to the ends of said compression ring so that the integrated catalyst can be elastically retained by the ceramic fiber within a frame consisting of said compression ring and said end rings.

Figure 2:
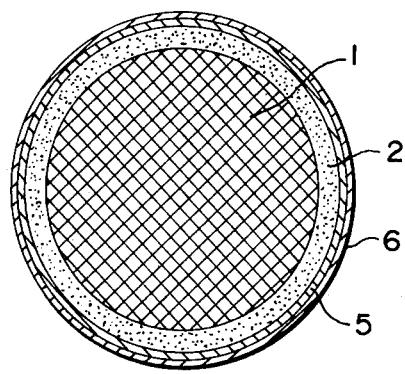
FIG. 2 is a transverse cross-sectional view of an integrated catalyst component according to the present invention.
Figure 3:
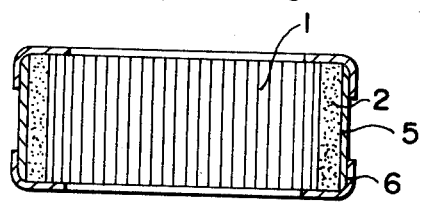
FIG. 3 is a longitudinal sectional view of an integrated catalyst component according to the present invention.

Referring now to the drawings, the integrated catalyst component according to the present invention will now be described. FIG. 2 is a cross-sectional view of the integrated catalyst component according to the present invention. FIG. 3 is a longitudinal sectional view of said component.

Figure 4:
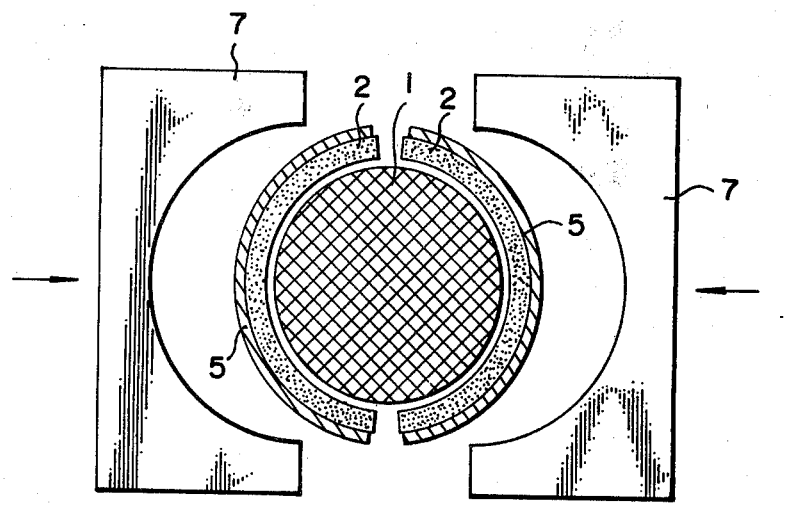
FIGS. 4 and 5 illustrate the process of assembling the integrated catalyst component of the present invention.
Figure 5:
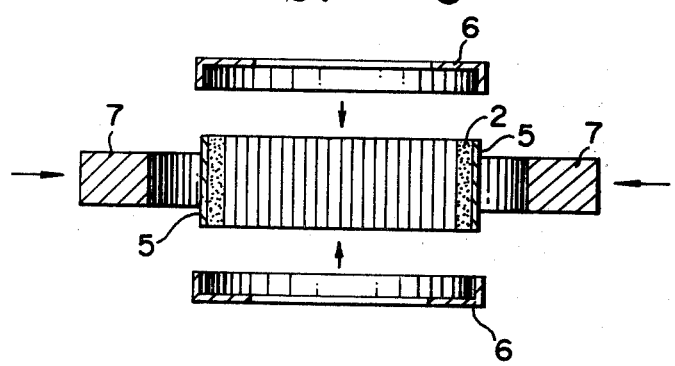

As illustrated in FIG. 4, the integrated catalyst 1 is wrapped in a molded ceramic fiber member 2, which is divided into two parts. Then the jig 7 is applied to tighten them by action on the compression ring 5. Thereafter, as illustrated in FIG. 5, the end rings 6 are attached to the outer ends of the compression ring 5, after which the joint between the compression ring 5 and the end rings 6 is welded, thereby producing an integrated catalyst component according to the present invention as illustrated in FIGS. 2 and 3. As is evident from FIGS. 3 and 5 each ring 6 has an annular end portion which extends across and covers the adjacent end of the fiber member 2 when the rings are placed on the compression ring 5. Such covering of the ends prevents direct exposure of the fiber member to exhaust gas.

Figure 6:
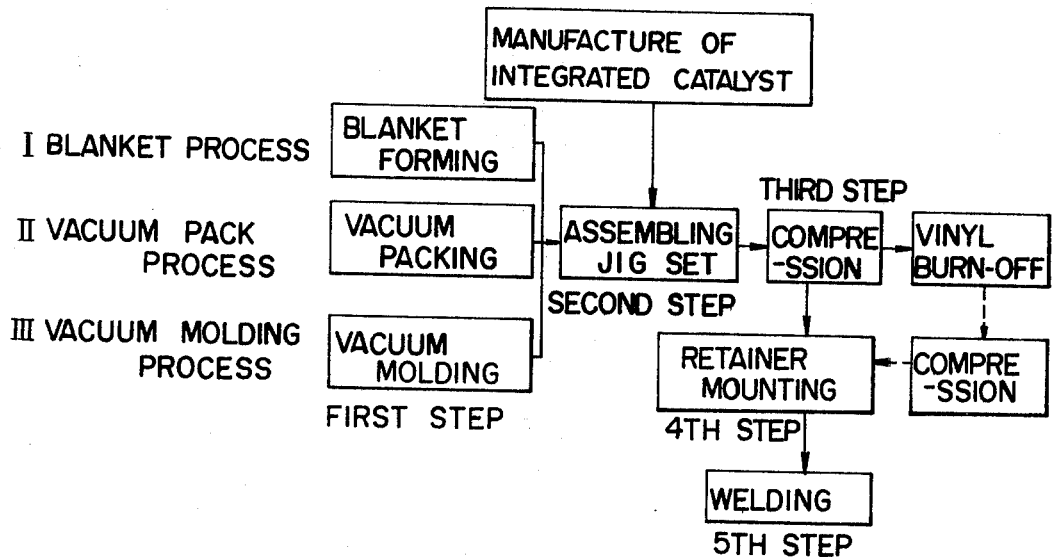
FIG. 6 is a flow sheet showing the steps of producing an integrated catalyst component according to the present invention.

The integrated catalyst component of the present invention is produced according to the sequence of manufacture illustrated in FIG. 6. Ceramic fiber to be employed as the material forming the molded ceramic fiber member 2 in the present invention is a cotton-like substance which is likely to break, so it must be so molded as to match the contour of the integrated catalyst. For the purpose of molding, commonly available methods are, as illustrated in FIG. 6, the blanket process, the vacuum pack process and the vacuum molding process.

Figure 7:
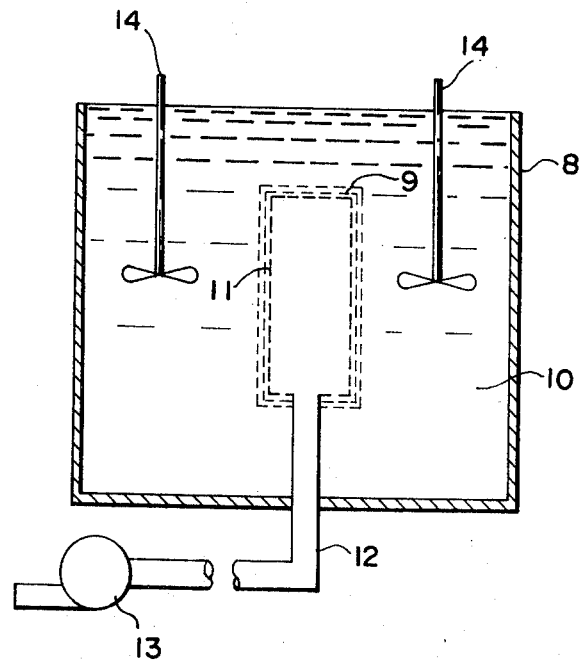
FIG. 7 illustrates the process of vacuum-molding the ceramic fiber.

According to the blanket process, ceramic fiber, which has been impregnated with a solution of, say, thermosetting phenolic resin, is press-formed in a mold and, after dry-hardening at about 200° C., is finished to form a molded product. According to the vacuum pack process, ceramic fiber is put in a soft bag of airtight material such as vinyl or nylon; and after evacuating the bag, it is packed to form a molded product. According to the vacuum molding process, as illustrated in FIG. 7, the ceramic fiber material 9 is dispersed in an aqueous solution 10; a porous mold 11 is placed in said solution; and suction is applied to said mold 11 through a pipe 12 by means of a pump 13, whereby the ceramic fiber 9 in the solution 10 is deposited on said mold, yielding a molded ceramic fiber.

Ceramic fiber to be used in the present invention must maintain its vibration-absorbing ability even at high temperature; and to assure the retention of this ability at high temperature, the fiber should be subjected to a substantial compressive force, but if this force is too strong, the fiber will break and lose its cushioning ability, and the integrated catalyst itself will be destroyed. Therefore in the present invention, "KAOWOOL" (Isolite Kogyo K.K.) and "Silica-fiber" (Nippon Glass Fiber K.K.) are used.

The characteristics of "KAOWOOL" and "Silica-fiber" are listed in Table 1.

Table 1

| Products Items | Characteristics of Ceramic Fibers | |
|---|---|---|
| | Characteristic Values | |
| | "KAOWOOL" (8#12.5mm thick) | "Silica-fiber" (Q-MLF) |
| Chemical Composition | $SiO_2 \ldots$ ⎫ $99.3\%$ $Al_2O_3 \ldots$ ⎭ $Fe_2O_3 \ldots 0.1\%$, $MgO \ldots 0.1\%$ $TiO_2 \ldots 0.1\%$ $CaO \ldots 0.1\%$, $ReO \ldots 0.3\%$ | $SiO_2 \ldots 98.1\%$ |
| Fiber Diameter (average) | $2.5\mu$ | $1.29\mu$ |
| Fiber length (average) | 100 mm | 20 mm |
| Shot content | 12% (over 65 mesh) | 0% |
| Density | 0.64, 0.96, 0.128, 0.166, (g/cm³) | 0.100, 0.055 (g/cm³) |
| Highest working temperature | 1260° C | 1100° C |
| Heat conductivity (600° C) | 0.134Kcal/mhr° C | 0.166Kcal/mhr° C |

The cushioning effects of "KAOWOOL" and "Silica-fiber" will be described with reference to FIGS. 8–10.

Figure 8:
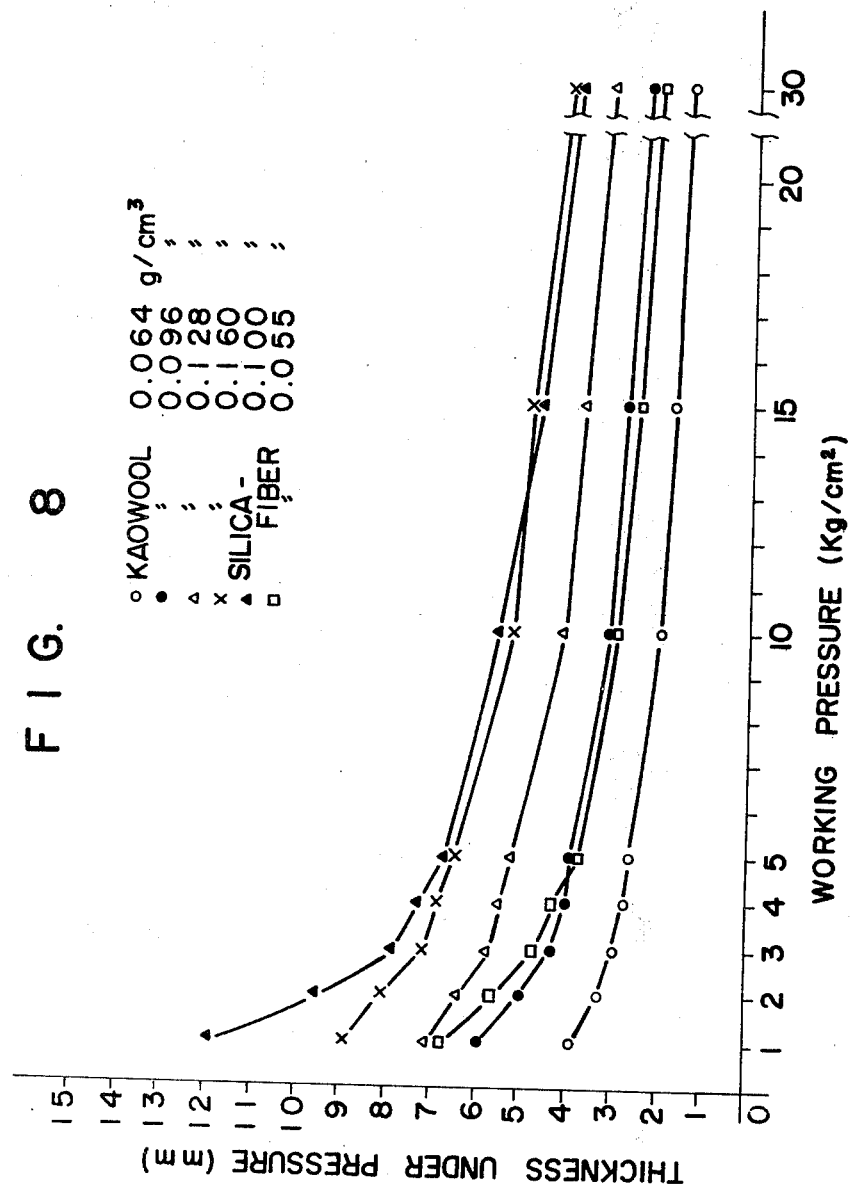
FIG. 8 is a diagram showing the relationship between the working pressure on the ceramic fiber and its thickness under pressure.

FIG. 8 illustrates the working pressure vs. thickness of the fiber when a "KAOWOOL" blanket and a "Silica fiber" blanket, 100 mm wide × 100 mm long × 25 mm thick, with different bulk densities are treated.

Figure 9:
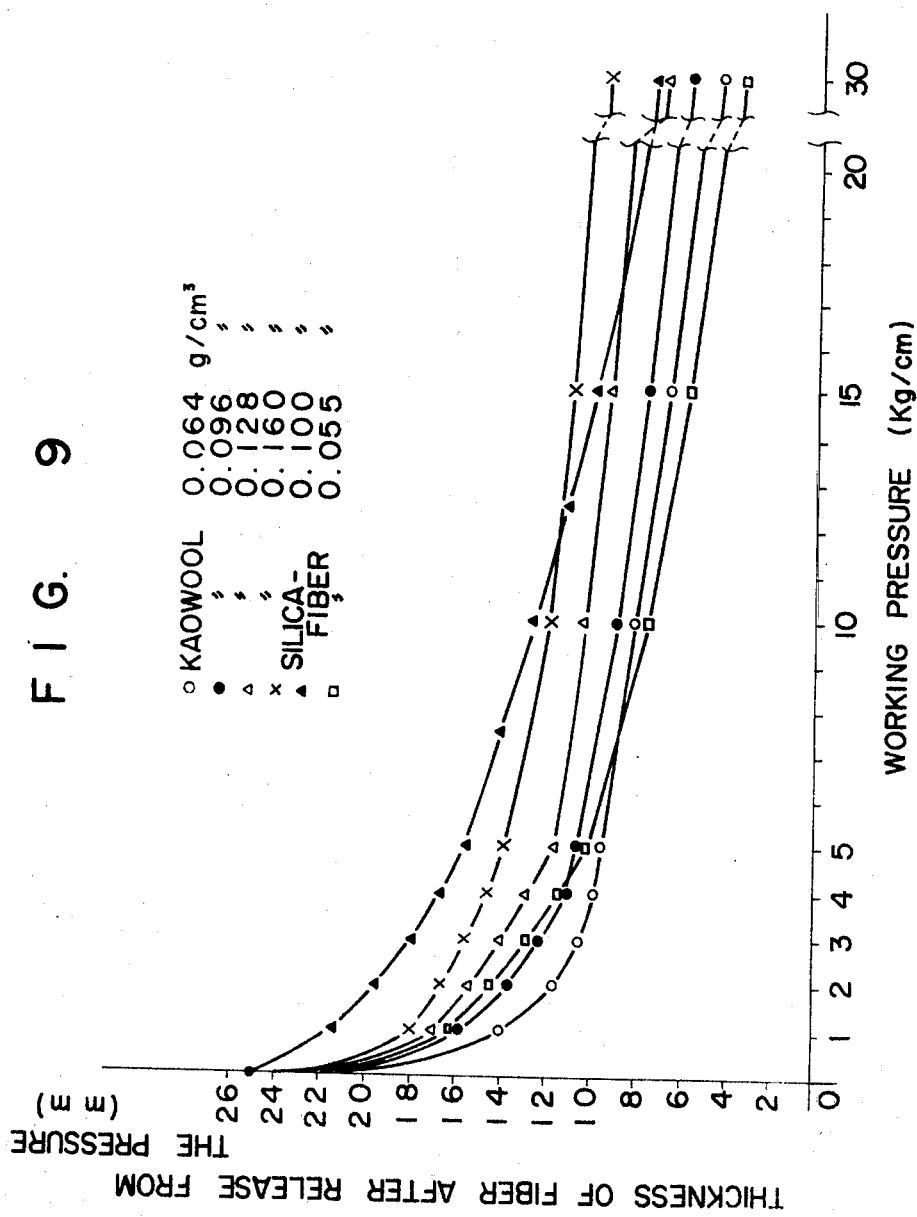
FIG. 9 is a diagram showing the thickness of the fiber after release from the pressure as a function of the working pressure.

FIG. 9 illustrates the thickness of the fiber blanket when released from the working pressure. As seen from this figure, the ceramic fiber retains its cushioning effect even when subjected to a pressure of over 1 kg/cm², which shows a great retention of the ability to hold the integrated catalyst.

Figure 10:
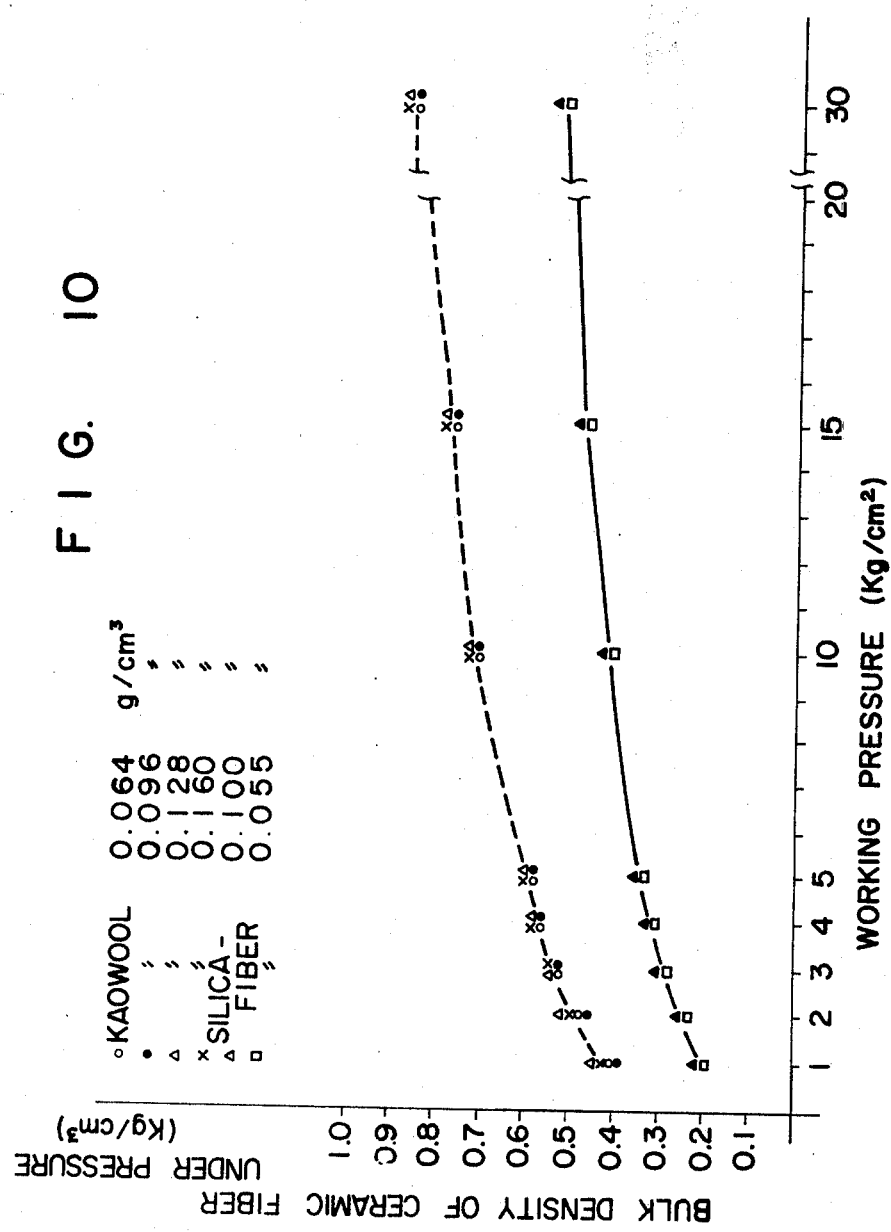
FIG. 10 is a diagram illustrating the relationship between the working pressure and the bulk density of ceramic fiber under pressure.

FIG. 10 illustrates the working pressure vs. the bulk density under pressure. According to this figure, depending on the kind of ceramic, the ceramic fiber has a different bulk density under pressure. For the same kind of ceramic fiber, the bulk density settles approximately to a constant value under pressures of over 3 kg/cm².

The following is a more detailed account of the present invention referring to exemplary embodiments.

EXAMPLE 1

In this embodiment the ceramic fiber member was molded by the blanket process and the integrated catalyst component was produced in the following steps:

1. "KAOWOOL" and "Silica-fiber" as described in Table 1 were employed as the fiber material. The fiber was cut to different specific sizes with different thicknesses to vary the assembled density. The specific size of the ceramic fiber members was half the circumference of the integrated catalyst.

2. A ceramic fiber blanket cut to the specific size was immersed in an aqueous solution of 3% phenol resin and 1% polyvinyl alcohol (hereinafter called PVA). Thereafter it was press-formed in a mold with the same curvature as the integrated catalyst to give it a shape covering half the circumference of the integrated catalyst, and it was then dry-hardened at about 250° C., yielding a molded product.

3. This molded product was, like the molded ceramic fiber member 2 in FIG. 4, wrapped around the integrated catalyst 1, which was then compressed from outside through the compression ring 5, using the tightening jig 7. The compressive force to be applied differs depending on the density of the ceramic fiber, but being a decisive factor for the durability of the holding layer, it should be appropriately selected. If the compressive force is too weak, the integrated catalyst will not be securely held and it will be broken by vibration during operation of the vehicle. On the contrary, if the force exerted is too strong, the integrated catalyst, as well as the fiber-holding layer, will be broken or the durability of the molded ceramic fiber at high temperature will greatly diminish.

4. Next, while the catalyst blanket and compression rings are still under pressure in jig 7, as indicated in FIG. 5, the end rings 6 are attached to the external ends of the compression ring 5, thereby finishing the assembly.

5. Upon removal of the jig 7 after assembly, the elasticity of the molded ceramic fiber 2 acts to expand the compression ring 5, thereby immobilizing the end rings 6. Thereafter said component is heated at 600° C. for about 15 minutes to decompose and eliminate the phenolic resin and polyvinyl alcohol which have been used as the ceramic fiber bonding agent.

6. If necessary, the joints between the end rings 6 and the compression ring in said component are welded for immobility.

When in the present invention the molded ceramic fiber 2 is wrapped, without being split into two, around the integrated catalyst, care should be taken in the process of compression, because the compression ring 5, when externally tightened, may shift its position, but the molded ceramic fiber member 2 is immovable. Therefore after compression, the density of the molded ceramic fiber member 2 may turn out to be non-uniform or the molded ceramic fiber member 2 may project into the joint of the compression ring 5.

EXAMPLE 2

In this embodiment, ceramic fiber was molded by the vacuum pack process and the integrated catalyst component was produced in the following steps.

1. The same two kinds of ceramic fiber as employed in Example 1, with different thicknesses, were cut to the specific size.

2. Ceramic fiber cut to the specific size was put into a nylon-polyethylene laminated bag (nylon ... 15μ thick; polyethylene ... 50μ thick, product of Furukawa Seisakusho); and vacuum packed by sealing the bag which had been evacuated by a vacuum pump. Depending on its bulk density, the ceramic fiber was compressed to ½-1/5 of the original volume by pressure difference between the inside and the outside of the bag.

3. The ceramic fiber thus molded was, in the same way as in Example 1, wrapped around the integrated catalyst. In the compressing process, the jig was heated to 300-500° C., thereby burning off the nylon-polyethylene laminated bag, and compression applied as in Example 1.

The joints were welded after assembly, if necessary, just as in Example 1.

EXAMPLE 3

In this embodiment, ceramic fiber was molded by the vacuum molding process and the integrated catalyst component was produced in the following steps.

1. The material "KAOWOOL" listed in Table 1 was dispersed in an aqueous solution containing 1% polyvinylalcohol (produced by Hayashi Zun-yaku K.K.).

2. As indicated in FIG. 7, said aqueous solution 10, containing the dispersed ceramic fiber 9 was poured into the vessel 8. A porous mold 11 of the specified shape immersed in said aqueous solution was connected via the pipe 12 to a pump 13, by which the water within the mold was sucked up, whereby the ceramic fiber 9 scattered in the solution 10 was deposited on the surface of the mold 11, yielding a molded ceramic fiber 9.

To obtain a uniform molded product, an agitator 14 had to be provided to agitate the solution 10 and assure uniform dispersion of the fiber 9.

3. Next, the molded ceramic fiber 9 was removed from the mold and dried at 100°-150° C.

4. Using the molded ceramic fiber 9 obtained in this manner, the integrated catalyst component was produced in the same way as in Example 1.

In the following tests of the various products from Examples 1-3, the performance of the layer for holding the integrated catalyst component according to the present invention was evaluated.

Test 1

A ... High-temperature vibration

The assembled catalyst component was heated to 800°-850° C. by a gas burner (using propane gas) and was subjected to three hours of axial and radial vibrations respectively at vibrational accelerations of 45 G and 90 HZ.

B ... High-temperature heat-cool cycle

The assembled catalyst component was heated for 30 minutes to 850°-900° C. by a gas burner (using propane gas), followed by cooling to the room temperature by compressed air. This cycle was repeated 100 times.

By repeating A and B in the sequence of A→ B→ A, the performance of various embodiments of components according to the invention was studied.

The results are summarized in Table 2.

Table 2

| Specimen No. | Integrated catalyst Type | Integrated catalyst Weight (g) | Ceramic fiber Brand | Ceramic fiber Molding by | Post-assemblage Average density | Post-assemblage Compressive kg/cm² | Results A | Results B | Results A | Rating θ |
|---|---|---|---|---|---|---|---|---|---|---|
| 1 | T | 300±40 | KAOWOOL | press-forming | 0.35 | 0.8 | X | — | — | X |
| 2 | " | " | " | " | 0.40 | 1 | ○ | X | X | X |
| 3 | " | " | " | " | 0.46 | 2 | ○ | ○ | X | Δ |
| 4 | " | " | " | " | 0.52 | 3 | ○ | ○ | ○ | ⊙ |
| 5 | " | " | " | " | 0.58 | 4 | ○ | ○ | X | Δ |
| 6 | " | " | " | vacuum pack | 0.36 | 0.8 | X | — | — | X |
| 7 | " | " | " | " | 0.41 | 1 | ○ | X | X | X |
| 8 | " | " | " | " | 0.45 | 2 | ○ | ○ | X | Δ |
| 9 | " | " | " | " | 0.51 | 3 | ○ | ○ | ○ | ⊙ |
| 10 | " | " | " | " | 0.60 | 4 | ○ | ○ | ○ | ⊙ |
| 11 | " | " | " | vacuum-mold | 0.35 | 0.8 | X | — | — | X |
| 12 | " | " | " | " | 0.41 | 1 | ○ | ○ | X | Δ |
| 13 | " | " | " | " | 0.46 | 2 | ○ | ○ | X | Δ |

Table 2-continued

| Specimen No. | Integrated catalyst Type | Weight (g) | Ceramic fiber Brand | Molding by | Post-assemblage Average density | Compressive kg/cm² | Results A | B | A | Rating |
|---|---|---|---|---|---|---|---|---|---|---|
| 14 | " | " | " | " | 0.51 | 3 | ○ | ○ | ○ | ⊙ |
| 15 | " | " | " | " | 0.60 | 4 | ○ | ○ | ○ | ⊙ |
| 16 | " | " | Silica-fiber | press-forming | 0.22 | 0.8 | X | — | — | X |
| 17 | " | " | " | " | 0.24 | 1 | ○ | ○ | X | Δ |
| 18 | " | " | " | " | 0.27 | 2 | ○ | ○ | X | Δ |
| 19 | " | " | " | " | 0.31 | 3 | ○ | ○ | ○ | ⊙ |
| 20 | " | " | " | " | 0.35 | 4 | ○ | ○ | ○ | ⊙ |
| 21 | " | " | " | vacuum pack | 0.21 | 0.8 | X | — | — | X |
| 22 | " | " | " | " | 0.24 | 1 | ○ | ○ | X | Δ |
| 23 | " | " | " | " | 0.27 | 2 | ○ | ○ | ○ | ⊙ |
| 24 | " | " | " | " | 0.30 | 3 | ○ | ○ | ○ | ⊙ |
| 25 | " | " | " | " | 0.35 | 4 | ○ | ○ | ○ | ⊙ |
| 26 | " | " | " | vacuum-mold | 0.22 | 0.8 | X | — | — | X |
| 27 | " | " | " | " | 0.23 | 1 | ○ | ○ | ○ | ⊙ |
| 28 | " | " | " | " | 0.27 | 2 | ○ | ○ | ○ | ⊙ |
| 29 | " | " | " | " | 0.30 | 3 | ○ | ○ | ○ | ⊙ |
| 30 | " | " | " | " | 0.34 | 4 | ○ | ○ | ○ | ⊙ |
| 31 | M | " | KAOWOOL | press-forming | 0.35 | 0.8 | X | — | — | X |
| 32 | " | " | " | " | 0.41 | 1 | ○ | ○ | X | Δ |
| 33 | " | " | " | " | 0.45 | 2 | ○ | ○ | X | Δ |
| 34 | " | " | " | " | 0.51 | 3 | ○ | ○ | ○ | ⊙ |
| 35 | " | " | " | " | 0.60 | 4 | ○ | ○ | ○ | ⊙ |
| 36 | " | " | " | vacuum pack | 0.36 | 0.8 | X | — | — | X |
| 37 | " | " | " | " | 0.41 | 1 | ○ | ○ | X | Δ |
| 38 | " | " | " | " | 0.46 | 2 | ○ | ○ | Δ | ○ |
| 39 | " | " | " | " | 0.52 | 3 | ○ | ○ | ○ | ⊙ |
| 40 | " | " | " | " | 0.61 | 4 | ○ | ○ | ○ | ⊙ |
| 41 | " | " | " | vacuum-mold | 0.34 | 0.8 | X | — | — | X |
| 42 | " | " | " | " | 0.41 | 1 | ○ | ○ | X | Δ |
| 43 | " | " | " | " | 0.45 | 2 | ○ | ○ | Δ | ○ |
| 44 | " | " | " | " | 0.52 | 3 | ○ | ○ | ○ | ⊙ |
| 45 | " | " | " | " | 0.60 | 4 | ○ | ○ | ○ | ⊙ |
| 46 | " | " | Silica-fiber | press-forming | 0.21 | 0.8 | X | — | — | X |
| 47 | " | " | " | " | 0.24 | 1 | ○ | X | X | X |
| 48 | " | " | " | " | 0.27 | 2 | ○ | ○ | Δ | ○ |
| 49 | " | " | " | " | 0.30 | 3 | ○ | ○ | ○ | ⊙ |
| 50 | " | " | " | " | 0.35 | 4 | ○ | ○ | ○ | ⊙ |
| 51 | " | " | " | vacuum pack | 0.20 | 0.8 | X | — | — | X |
| 52 | " | " | " | " | 0.25 | 1 | ○ | Δ | X | X |
| 53 | " | " | " | " | 0.27 | 2 | ○ | ○ | Δ | ○ |
| 54 | " | " | " | " | 0.31 | 3 | ○ | ○ | ○ | ⊙ |
| 55 | " | " | " | " | 0.34 | 4 | ○ | ○ | ○ | ⊙ |
| 56 | " | " | " | vacuum-mold | 0.21 | 0.8 | X | — | — | X |
| 57 | " | " | " | " | 0.25 | 1 | ○ | ○ | X | Δ |
| 58 | " | " | " | " | 0.28 | 2 | ○ | ○ | ○ | ⊙ |
| 59 | " | " | " | " | 0.31 | 3 | ○ | ○ | ○ | ⊙ |
| 60 | " | " | " | " | 0.36 | 4 | ○ | ○ | ○ | ⊙ |

In Table 2, T indicates a platinum catalyst carried on the catalyst carrier T of NIPPONDENSO K.K., while M indicates a palladium catalyst carried on the catalyst carrier "Thermacomb AlSiMag 795" of 3 M K.K. The impregnated volume of ceramic fiber is within ± 0.2 g of the indicated value. The average density is calculated by the following formula:

$$\frac{\text{Impregnated volume (g)}}{\text{as-cut area of ceramic fiber (width} \times \text{length in cm}^2) \times \text{as-impregnated thickness (cm)}}$$

The compressive force is estimated from the above-mentioned average density, using a previously established relationship between compressive force vs. average density (FIG. 5).

Under the heading "Results" the mark X is used when the integrated catalyst broke within five minutes of testing; Δ is used when the catalyst broke more than 5 minutes from the beginning but before the end of testing; and ○ is used when the catalyst remained intact up to the conclusion of testing. Under the heading "Rating," the mark X means that the holding ability of the integrated catalyst component was so low that in the first test A the catalyst broke; Δ means that the durability of said holding ability was insufficient and shortly after the start of the second test A, the catalyst broke; ○ means that the holding ability of the integrated catalyst component was superior to that of a conventional catalyst component (manufactured according to the U.S. Pat. No. 3,441,381), but its durability was unstable; ⊙ means that the integrated catalyst component exhibited an extremely good holding ability.

Test 2

Figure 11:
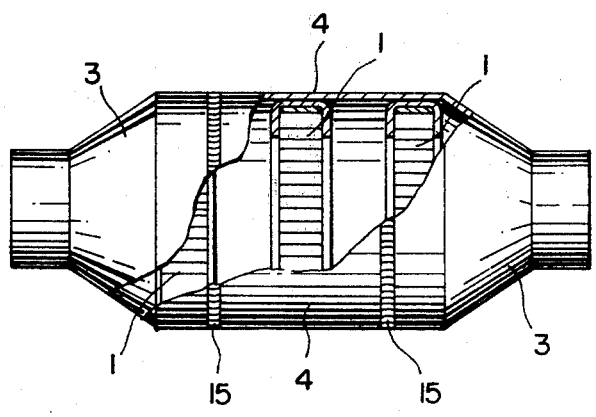
FIG. 11 is a partially cutaway side view of a purifier housing an integrated catalyst component according to the present invention.

Various integrated catalyst components produced in Examples 1-3 were housed, as indicated in FIG. 11, in the outer casing 4. End members 3 were attached to both ends of the outer casing 4. The joint 15 between the two was welded, and an auto emission purifier was thus manufactured. This purifier, using the specimens in Table 2, Nos. 4, 10, 15, 20, 25, 30, 35, 40, 45, 50, 55 and 60, was mounted on an automobile and a durability test was then carried out by operating the car for 5000 km over a poor road at a speed of 40 kilometers per hour. In all cases no breakage occurred.

Comparative Test 1

For the purpose of comparing the durability of the integrated catalyst component having a ceramic fiber holding sleeve according to the present invention, an exhaust gas purifier using the conventional integrated catalyst of FIG. 1 in which the exhaust gas comes into direct contact with the molded ceramic fiber was manufactured. In this purifier, the molded ceramic fiber sleeve 2 ("KAOWOOL" of Table 1) was formed around the integrated catalyst 1; the assembly was housed in the outer casing 4, divided into two parts; and the end member 3 was attached to the outer casing 4.

In a durability test of this purifier mounted on an engine bench, the molded ceramic fiber sleeve 2 disintegrated in three hours of operation at 4000 r.p.m., while the integrated catalyst 1 dropped and broke.

What is claimed is:

1. Method of assembling an integrated catalyst component for the purification of exhaust gases from an internal combustion engine, which comprises the steps of positioning an elastic ceramic fiber sleeve around the integrated catalyst compressing the sleeve against the integrated catalyst by bringing together around said catalyst the two parts of a longitudinally divided compression ring having a diameter less than the uncompressed outer diameter of said fiber sleeve, and then attaching holding rings to the ends of said compression ring by extending the holding rings axially over the ends of the compression ring to hold said two parts together against said fiber sleeve, whereby by virtue of the elasticity of the ceramic fiber said integrated catalyst is securely held within the frame constituted by said compression ring and holding rings, said step of attaching holding rings comprising attaching holding rings having radially inwardly extending annular portions extending inwardly across opposite ends of the compressed fiber sleeve to protect the sleeve from direct contact of exhaust gases.

2. A method according to claim 1 wherein, said step of compressing said fiber sleeve comprises, compressing said sleeve to between 3 and 4 Kg/cm.

3. A method according to claim 1 wherein said step of positioning an elastic fiber sleeve comprises, preforming an elastic fiber sleeve and positioning the preformed sleeve around the catalyst.

4. A method according to claim 3 wherein said step of preforming the elastic fiber sleeve comprises preforming the sleeve by a method selected from the group consisting essentially of blanket forming, vacuum packing, and vacuum molding.

5. A method according to claim 1 wherein said elastic fiber sleeve is made of $Al_2O_3$.

6. A method according to claim 1 wherein said elastic fiber sleeve is made of $SiO_2$.

* * * * *